United States Patent [19]

Zeidler et al.

[11] Patent Number: 4,479,906

[45] Date of Patent: Oct. 30, 1984

[54] TRISAZO DYE

[75] Inventors: Georg Zeidler, Limburgerhof; Guenter Hansen; Wolfgang Schulte, both of Ludwigshafen, all of Fed. Rep. of Germany

[73] Assignee: BASF Aktiengesellschaft, Fed. Rep. of Germany

[21] Appl. No.: 413,664

[22] Filed: Nov. 7, 1973

[51] Int. Cl.³ .............. C09B 33/22; C09B 35/40; C09B 35/42; C09B 35/44

[52] U.S. Cl. .................. 260/169; 260/166; 260/171; 260/173; 260/178; 260/198

[58] Field of Search .............. 260/169, 171, 173

[56] References Cited

U.S. PATENT DOCUMENTS

| | | | |
|---|---|---|---|
| 514,599 | 2/1894 | Hoffmann et al. | 260/171 |
| 627,679 | 6/1899 | Boniger et al. | 260/171 |
| 652,456 | 6/1900 | Boniger et al. | 260/171 |
| 1,014,982 | 1/1912 | Turner et al. | 260/171 |
| 1,014,983 | 1/1912 | Turner et al. | 260/171 |
| 1,885,609 | 11/1932 | Leemann et al. | 260/171 |
| 2,073,000 | 3/1937 | Clingestein et al. | 260/171 |
| 2,157,295 | 5/1939 | Lier | 260/171 |
| 2,296,925 | 9/1942 | Hitch | 260/171 |
| 2,671,776 | 3/1954 | Gunst | 260/171 |
| 2,731,459 | 1/1956 | Gunst | 260/171 |
| 3,467,645 | 9/1969 | Keller et al. | 260/169 X |

FOREIGN PATENT DOCUMENTS

| | | | |
|---|---|---|---|
| 1240603 | 5/1967 | Fed. Rep. of Germany | 260/169 |
| 2110771 | 9/1972 | Fed. Rep. of Germany | 260/173 |
| 1038893 | 10/1953 | France | 260/169 |
| 1097549 | 2/1955 | France | 260/169 |
| 1109435 | 1/1956 | France | 260/169 |
| 1242226 | 8/1960 | France | 260/169 |
| 870698 | 6/1961 | United Kingdom | 260/173 |
| 1327914 | 8/1973 | United Kingdom | 260/173 |

Primary Examiner—Floyd D. Higel
Attorney, Agent, or Firm—Keil & Weinkauf

[57] ABSTRACT

Trisazo dyes containing sulfo groups and having the formula:

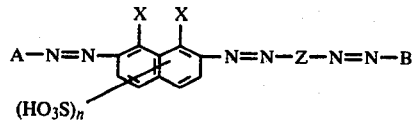

which for the most part give black colorations on paper and particularly on leather and are therefore especially useful as leather dyes.

1 Claim, No Drawings

TRISAZO DYE

The invention relates to dyes which in the form of the free acids correspond to the formula (I):

$$A-N=N-\underset{(HO_3S)_n}{\overset{X\quad X}{\text{[naphthalene]}}}-N=N-Z-N=N-B \quad (I)$$

in which
A is the radical of an aromatic-carboxyclic diazo component;
B is the radical of a coupling component which contains hydroxyl and/or amino groups;
n is the integer 1 or 2; one
X is hydroxyl and the other
X is amino,
Z is

[structure: phenyl-NH-phenyl with SO₃H]

or

[structure: R-substituted phenyl-SO₂N(T)-phenyl-R¹]

T is hydrogen, methyl, ethyl, benzyl, β-hydroxyethyl, β-hydroxypropyl, β-cyanoethyl, β-carboxyethyl or β-carbalkoxyethyl of a total of two to five carbon atoms;
R is hydrogen, hydroxyl, chloro, bromo, nitro, methyl, ethyl or carboxyl; and
$R^1$ is hydrogen, methyl, ethyl, chloro, bromo, cyano, nitro, hydroxysulfonyl, carboxyl or alkoxycarbonyl.

The radicals A are derived particularly from the aminonaphthalene and preferably the aniline series. Examples of substituents for the radicals A are: chloro, bromo, methyl, ethyl, methoxy, ethoxy, nitro, cyano, methylsulfonyl, ethylsulfonyl, carbamoyl, sulfonamido, N-substituted carbamoyl or sulfonamido, carboxyl, alkoxycarbonyl, hydroxysulfonyl or phenylazo; the substituents may be present singly or in combination.

Examples of N-substituted carbamoyl or sulfonamido radicals are the monosubstituted or disubstituted N-methylamides, N-ethylamides, N-propylamides, N-butylamides and N-β-hydroxyethylamides.

Examples of alkoxycarbonyl radicals are methoxycarbonyl, ethoxycarbonyl, propoxycarbonyl and butoxycarbonyl; these radicals also apply for $R^1$.

Radicals B may bear as substituents not only hydroxy and/or amino groups but also for example alkyl such as methyl or ethyl, alkoxy such as methoxy or ethoxy, halogen such as chloro or bromo, nitro or hydroxysulfonyl. They preferably belong to the benzene series.

Individual radicals B may be for example: diaminophenyl, diaminomethylphenyl, phenylaminohydroxyphenyl, hydroxyphenyl, hydroxymethylphenyl, aminohydroxyphenyl and dihydroxyphenyl.

Dyes of the formula (IIa):

$$A^1-N=N-\underset{HO_3S\quad SO_3H}{\overset{X\quad X}{\text{[naphthalene]}}}-N=N-\underset{SO_3H}{\text{[phenyl]}}-NH-\text{[phenyl]}-N=N-B \quad (IIa)$$

are particularly preferred in which
$A^1$ is halophenyl, nitrophenyl or sulfophenyl and
B and X have the meanings given in formula (I).

Dyes of the formula (IIb):

$$A^1-N=N-\underset{HO_3S\quad SO_3H}{\overset{X\quad X}{\text{[naphthalene]}}}-N=N-\underset{}{\overset{R^2}{\text{[phenyl]}}}-Y-\underset{R^3}{\text{[phenyl]}}-N=N-B \quad (IIb)$$

are also particularly valuable industrially in which
$A^1$, B and X have the said meanings,
$R^2$ is hydrogen, nitro or carboxyl;
$R^3$ is hydrogen, chloro, nitro, carboxyl or hydroxysulfonyl; and
Y is $$-SO_2-\underset{T^1}{N}- \text{ or } -\underset{T^1}{N}-SO_2-$$

where
$T^1$ is hydrogen, methyl, β-hydroxyethyl or β-cyanoethyl.

Examples of preferred coupling components HB are m-phenylenediamine, 2,4-diamino-1-methylbenzene, 3'-hydroxyphenylaminobenzene, phenol, p-cresol or resorcinol or benzene or diphenylamine derivatives containing hydroxyl and/or amino groups in general.

$R^2$ and $R^3$ are preferably hydrogen.

Dyes of the formula (I) may be prepared by coupling a diazo compound of an amine of the formula (III):

$$A-NH_2 \quad (III)$$

or a tetrazo compound of an amine of formula (IV):

$$H_2N-Z-NH_2 \quad (IV)$$

with a compound of the formula (V):

$$\underset{}{\overset{X\quad X}{\text{[naphthalene]}}}-(SO_3H)_n \quad (V)$$

in an acid medium and reacting the intermediate of the formula (VI):

$$A-N=N-\underset{}{\overset{H_2N\quad OH}{\text{[naphthalene]}}}-(SO_3H)_n \quad (VI)$$

or (VII):

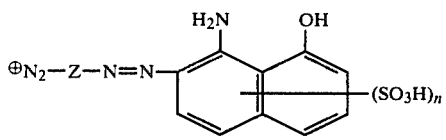

in an alkaline medium with a diazo compound of an amine of the formula (III) or (IV) and uniting the reaction product formed in an alkaline medium with a coupling component of the formula (VIII):

HB  (VIII)

Examples of amines of the formula (III) are: 2-chloro-1-aminobenzene, 3-chloro-1-aminobenzene, 4-chloro-1-aminobenzene, 1-aminobenzene-2-sulfonic acid, 1-aminobenzene-3-sulfonic acid, 1-aminobenzene-4-sulfonic acid, 1-amino-2-methylbenzene, 1-amino-4-methylbenzene, 1-amino-2-nitrobenzene, 1-amino-4-nitrobenzene, 1-amino-4-methoxybenzene, 2,4-dichloro-1-aminobenzene, 2,5-dichloro-1-aminobenzene, 4-chloro-1-aminobenzene-2-sulfonic acid, 1-aminonaphthalene-2-sulfonic acid, 4-aminoazobenzene, methyl-4-aminobenzoate, 4-methylsulfonyl-1-aminobenzene, 4-sulfonamido-1-aminobenzene and 4-cyano-1-aminobenzene.

Examples of diamines of formula (IV) are: 4-aminobenzenesulfonyl-4'-aminoanilide, 4-aminobenzenesulfonyl-4'-amino-3'-chloroanilide, 4-aminobenzenesulfonyl-4'-amino-3'-nitroanilide, 4-aminobenzenesulfonyl-4'-amino-3'-sulfonanilide, 4-aminobenzenesulfonyl-4'-amino-3'-carboxyanilide, 4-amino-3-nitrobenzenesulfonyl-4'-aminoanilide, 4-amino-3-nitrobenzenesulfonyl-4'-amino-3'-chloroanilide, 4-amino-3-nitrobenzenesulfonyl-4'-amino-3'-nitroanilide, 4-amino-3-nitrobenzenesulfonyl-4'-amino-3'-sulfoanilide, 4-amino-3-nitrobenzenesulfonyl-4'-amino-3'-carboxyanilide, 4-amino-3-carboxybenzenesulfonyl-4'-aminoanilide, 4-amino-3-carboxybenzenesulfonyl-4'-amino-3'-chloroanilide, 4-amino-3-carboxybenzenesulfonyl-4'-amino-3'-nitroanilide, 4-amino-3-carboxybenzenesulfonyl-4'-amino-3'-sulfoanilide, 4-amino-3-carboxybenzenesulfonyl-4'-amino-3'-carboxyanilide, 4-aminobenzenesulfonyl-4'-amino-N-methylanilide and 4-aminobenzenesulfonyl-4'-amino-N-β-hydroxyethylanilide.

Examples of coupling components of the formula (VIII) HB are: 1,3-diaminobenzene, 1,3-diamino-4-methylbenzene, 3'-hydroxyphenylaminobenzene, hydroxybenzene, 4-methyl-1-hydroxybenzene, 2,4-diamino-1-chlorobenzene, 2,4-diamino-1-nitrobenzene, N,N-β-dihydroxyethylaminobenzene, 1-diethylamino-3-acetylaminobenzene, 1,3-dihydroxybenzene and 3-diethylamino-1-hydroxybenzene.

Examples of aminohydroxynaphthalenesulfonic acids of formula (V) are: 1-amino-8-hydroxynaphthalene-3,6-disulfonic acid, 1-amino-8-hydroxynaphthalene-4,6-disulfonic acid and 1-amino-8-hydroxynaphthalene-4-sulfonic acid.

The new dyes are eminently suitable for dyeing hydroxy-containing nitrogenous natural or synthetic fibrous materials, for example cellulose, cotton, regenerated cellulose, wool, union, silk, nylon and paper but particularly for dyeing leather.

Green to black coloration having good fastness properties are obtained.

The following Examples illustrate the invention. Parts and percentages are by weight unless otherwise stated.

EXAMPLE 1

A neutral solution of 31.9 parts of 1-amino-8-hydroxynaphthalene-3,6-disulfonic acid in 300 parts of water is allowed to flow slowly into a diazonium salt solution prepared from 2,4-dichloro-1-aminobenzene while stirring intensely. The coupling is completed after stirring overnight. The whole is then cooled to about 10° C. and a tetrazonium solution is added which has been prepared as follows: 27.9 parts of 4,4'-diaminodiphenylamine-2-sulfonic acid is dissolved in 240 parts of water with 50 parts of 36% hydrochloric acid, 150 parts of ice is added and tetrazotization is carried out with a solution of 14 parts of sodium nitrite.

After the tetrazonium salt solution has been added the coupling is completed by dripping in dilute sodium carbonate solution at pH 9. After thirty minutes a solution 18.5 parts of 3-hydroxydiphenylamine in 100 parts of water and 10 parts of 40% caustic soda solution is added. The whole is stirred for another twelve hours and then heated to 70° C. The dye is salted out with 160 parts of potassium chloride, suction filtered and dried at 70° C. A black powder is obtained which dissolved in water with a violet color and dyes leather a full black shade.

The dyes characterized in the following Table by A and B are prepared analogously:

$$B-N=N-\langle\rangle-NH-\langle SO_3H\rangle-N=N-\text{(naphthalene: HO, NH}_2\text{, HO}_3\text{S, SO}_3\text{H)}-N=N-A$$

| Example | B | A | Hue |
|---|---|---|---|
| 2 | OH–⟨⟩–NH–⟨⟩ | O₂N–⟨⟩–NH₂ | black |
| 3 | OH–⟨⟩–NH–⟨⟩ | Cl–⟨⟩–NH₂ | black |
| 4 | OH–⟨⟩–NH–⟨⟩ | HO₃S–⟨⟩–NH₂ | black, reddish |
| 5 | ⟨⟩(CH₃)–OH | O₂N–⟨⟩–NH₂ | black, greenish |
| 6 | ⟨⟩(N(C₂H₅)₂)–OH | O₂N–⟨⟩–NH₂ | black |
| 7 | ⟨⟩(SO₃H)–N(C₂H₅)₂ | Cl–⟨⟩–NH₂ | black, bluish |

-continued

B—N=N—⟨phenyl⟩—NH—⟨phenyl-SO3H⟩—N=N—⟨naphthalene with HO, NH2, HO3S, SO3H⟩—N=N—A

| Example | B | A | Hue |
|---|---|---|---|
| 8 | 2-SO3H, 4-N2H aniline (SO3H, NH2, N2H substituted benzene) | Cl—⟨phenyl⟩—NH2 | black, brownish |

B—N=N—⟨phenyl⟩—NH—⟨phenyl-SO3H⟩—N=N—⟨naphthalene with HO, NH2, HO3S, SO3H⟩—N=N—A

| Example | B | A | Hue |
|---|---|---|---|
| 11 | 2-CH3, 4-NH2 aniline (CH3, NH2, NH2) | Cl—⟨phenyl⟩—NH2 | black, greenish |
| 12 | 2-CH3, 4-NH2 aniline (CH3, NH2, NH2) | HO3S—⟨phenyl⟩—NH2 | black, reddish |
| 13 | 2-CH3, 4-NH2 aniline (CH3, NH2, NH2) | O2N—⟨phenyl with SO3H⟩—NH2 | black, reddish |
| 14 | 2-Cl, 4-NH2 aniline (Cl, NH2, NH2) | O2N—⟨phenyl⟩—NH2 | black, reddish |
| 15 | 3-NHCOCH3, N,N-diethyl aniline | O2N—⟨phenyl⟩—NH2 | black |
| 16 | N,N-diethylaniline | O2N—⟨phenyl⟩—NH2 | black |

EXAMPLE 9

A neutral solution of 31.9 parts of 1-amino-8-hydroxynaphthalene-4,6-disulfonic acid in 300 parts of water is allowed to flow slowly into a diazonium salt solution prepared from 16.2 parts of 2,4-dichloro-1-aminobenzene with intense stirring. Coupling is complete after stirring overnight. The whole is cooled to about 10° C. and a tetrazonium salt solution is added which has been prepared as follows: 27.9 parts of 4,4'-diaminodiphenylamine-2-sulfonic acid is dissolved in 240 parts of water with 50 parts of 36% hydrochloric acid, 150 parts of ice is added and then bisdiazotization is carried out with a solution of 14 parts of sodium nitrite.

After the solutions have been combined the coupling is completed at pH 9 by dripping in dilute sodium carbonate solution. Thirty minutes later a solution of 18.5 parts of 3-hydroxydiphenylamine in 100 parts of water and 10 parts of 40% caustic soda solution is introduced. The whole is stirred for another twelve hours and then heated to 70° C. The dye is salted out with 160 parts of potassium chloride, suction filtered and dried at 70° C. It is obtained as a black powder which is soluble in water with a violet color and dyes leather full bluish black hues.

EXAMPLE 10

13.8 parts of 4-nitro-1-aminobenzene is diazotized by a conventional method and then a neutral solution of 31.9 parts of 1-amino-8-hydroxynaphthalene-3,6-disulfonic acid in 300 parts of water is allowed to flow into the diazo solution. Coupling is over after stirring overnight. The whole is then cooled to 10° C. and there is added to it a bisdiazonium salt solution prepared as described in Example 1 from 4,4'-diaminodiphenylamine-2-sulfonic acid. A pH of 9 is then set up with dilute caustic soda solution. Unilateral coupling is completed after about thirty minutes and a solution of 12.2 parts of 2,4-diamino-1-methylbenzene in 100 parts of water and 12 parts of 36% hydrochloric acid is added. To complete the further coupling the pH is raised to 9.5 with the required amount of sodium carbonate solution and the whole is stirred for twelve hours at ambient temperature. The whole is then heated to 50° C., 100 parts of potassium chloride is added, and the dye is suction filtered and dried at 70° C. The dye dyes leather greenish black hues.

Dyes characterized in the following Table by A and B are prepared analogously.

EXAMPLE 17

12.7 parts of 4-chloro-1-aminobenzene is dissolved in 100 parts of water and 30 parts of 36% hydrochloric acid, 100 parts of ice is added and diazotization is effected with a solution of 7.0 parts of sodium nitrite. After about sixty minutes at 0° to 5° C. the excess of nitrate is removed with a little sulfamic acid. Then a solution of 23.9 parts of 1-amino-8-hydroxynaphthalene-4-sulfonic acid in 300 parts of water which has been adjusted to pH 6.5 with sodium carbonate is allowed to flow into the diazo component. A pH of 2.5 is set up with a sodium acetate solution within three hours at 5° to 10° C. and the whole is stirred for another twelve hours. The coupling is completed after this period. The whole is then cooled to 10° C., a tetrazo solution prepared from 27.9 parts of 4,4'-diaminodiphenylamine-2-sulfonic acid is added and a pH of 9.5 is set up with dilute sodium carbonate solution. Thirty minutes later an aqueous solution of 10.8 parts of 1,3-diaminobenzene is added, stirring is continued at ambient temperature for twelve hours and the whole is then heated to 60° C. The dye is salted out with 200 parts of potassium chloride, suction filtered and dried at 70° C. It dyes leather full greenish black hues.

EXAMPLE 18

12.7 parts of 4-chloro-1-aminobenzene is dissolved in 100 parts of water and 30 parts of 36% hydrochloric acid, 100 parts of ice is added and diazotization is carried out with a solution of 7.1 parts of sodium nitrite. After about sixty minutes at 0° to 5° C. the excess of nitrite is removed with a little sulfamic acid. A solution of 31.9 parts of 1-amino-8-hydroxynaphthalene-3,6-disulfonic acid in 300 parts of water which has been adjusted with sodium carbonate to pH 6.5 is allowed to flow into the diazo component. Then within three hours at 5° to 10° C. a pH of 2.5 is set up with sodium acetate solution and stirring is continued for another twelve hours. After this period the coupling is completed. The whole is cooled to 10° C., a tetrazo solution prepared from 27.9 parts of 4,4'-diaminodiphenylamine-2-sulfonic acid is added and a pH of 9.5 is set up with dilute sodium carbonate solution. Thirty minutes later an aqueous solution of 10.8 parts of 1,3-diaminobenzene is added, stirring is continued for twelve hours at ambient temperature and then the whole is heated to 60° C. The dye is salted out with 200 parts of potassium chloride, suction filtered and dried at 70° C. It dyes leather full greenish black dues.

The dyes set out in the following Table are prepared by a method analogous to that in Example 18.

B—N=N—[phenyl]—NH—[phenyl(HO$_3$S)]—N=N—[naphthalene(HO, NH$_2$, HO$_3$S, SO$_3$H)]—N=N—A

| Example | B | A | Hue |
|---|---|---|---|
| 19 | [phenyl]-NH$_2$, NH$_2$ | O$_2$N-[phenyl]-NH$_2$ | black |
| 20 | [phenyl]-NH$_2$, NH$_2$ | HO$_3$S-[phenyl]-NH$_2$ | black, reddish |
| 21 | [phenyl]-NH$_2$, NH$_2$ | O$_2$N-[phenyl(SO$_3$H)]-NH$_2$ | black, reddish |
| 22 | [phenyl]-OH, OH | O$_2$N-[phenyl]-NH$_2$ | black, greenish |
| 23 | [phenyl]-OH, OH | Cl-[phenyl]-NH$_2$ | black, greenish |

EXAMPLE 24

27.9 parts of 4,4'-diaminodiphenylamine-2-sulfonic acid is dissolved in 240 parts of water and 50 parts of 36% hydrochloric acid, 150 parts of ice is added and tetrazotization is carried out with a solution of 14 parts of sodium nitrite. After sixty minutes at 0° to 5° C. the excess of nitrite is removed with a little sulfamic acid. A neutral solution of 31.9 parts of 1-amino-8-hydroxynaphthalene-3,6-disulfonic acid in 300 parts of water is then allowed to flow in. Neutralization to pH 2.5 is carried out within three hours with a dilute sodium acetate solution and the whole is stirred for twelve hours. After this period the unilateral coupling is over. The whole is then cooled to 10° C. and there is added a diazo solution prepared by a conventional method from 13.8 parts of 4-nitro-a-aminobenzene. A pH of 9.0 is then set up with dilute sodium carbonate solution. Thirty minutes later a solution of 18.5 parts of 3-hydroxydiphenylamine in 100 parts of water and 10 parts of 40% caustic soda solution is added, stirring is continued for another twelve hours at room temperature and finally the whole is heated to 50° C. The dye is salted out with 200 parts of potassium chloride, suction filtered and dried at 70° C. It dyes leather neutral black hues.

The dyes set out in the following Table are prepared by a method analogous to that of Example 24.

B—N=N—[phenyl]—NH—[phenyl(HO$_3$S)]—N=N—[naphthalene(H$_2$N, OH, HO$_3$S, SO$_3$H)]—N=N—A

| Example | B | A | Hue |
|---|---|---|---|
| 25 | OH-[phenyl]-NH-[phenyl] | [phenyl]-NH$_2$ | black, greenish |
| 26 | OH-[phenyl]-NH-[phenyl] | Cl-[phenyl(Cl)]-NH$_2$ | black, reddish |
| 27 | OH-[phenyl]-NH-[phenyl] | HO$_3$S-[phenyl]-NH$_2$ | black, reddish |
| 28 | [phenyl]-OH | O$_2$N-[phenyl]-NH$_2$ | black, greenish |
| 29 | [phenyl(N(C$_2$H$_5$)$_2$)]-OH | O$_2$N-[phenyl]-NH$_2$ | black, greenish |
| 30 | [phenyl(SO$_3$H)]-N(C$_2$H$_5$)(C$_2$H$_5$) | Cl-[phenyl]-NH$_2$ | black, bluish |
| 31 | [phenyl(SO$_3$H, NH$_2$)]-NH$_2$ | Cl-[phenyl(Cl)]-NH$_2$ | black, bluish |

EXAMPLE 32

27.9 parts of 4,4'-diaminodiphenylamine-2-sulfonic acid is bisdiazotized as described in Example 24 and then coupled with a neutral solution of 31.9 parts of 1-amino-8-hydroxynaphthalene-4,6-disulfonic acid.

After the unilateral coupling is over the whole is cooled to 10° C., diazonium salt solution prepared in the usual way from 16.2 parts of 2,4-dichloro-1-aminobenzene is added and the pH is adjusted to 9.5 with dilute caustic soda solution. Thirty minutes later a solution of 12.2 parts of 2,4-diamino-1-methylbenzene in 100 parts of water and 12 parts of 36% hydrochloric acid is added. To complete the coupling the pH is raised to 9.5 with the necessary amount of dilute caustic soda solution and the whole is stirred for another twelve hours at ambient temperature. After the pH has been adjusted to 1 by adding hydrochloric acid the dye is salted out with 100 parts of potassium chloride, suction filtered and dried at 70° C. It is obtained as a water-soluble black powder which dyes leather bluish black hues.

EXAMPLE 33

27.9 parts of 4,4′-diaminodiphenylamine-2-sulfonic acid is dissolved in 240 parts of water and 50 parts of 36% hydrochloric acid, 150 parts of ice is added and bisdiazotization is carried out with a solution of 14 parts of sodium nitrite. After about sixty minutes at 0° to 5° C. the excess of nitrite is removed with a little sulfamic acid; a solution of 31.9 parts of 1-amino-8-hydroxynaphthalene-3,6-disulfonic acid in 300 parts of water which has been rendered neutral with caustic soda solution is allowed to flow in. The whole is neutralized within three hours at 0° to 5° C. with a dilute sodium acetate solution to pH 2.5 and stirring is continued for twelve hours. The unilateral coupling is completed within this period. The whole is then cooled to 10° C. and a diazo solution prepared in the usual way from 12.7 parts of 4-chloro-1-aminobenzene is added. A pH of 9.0 is then set up with dilute sodium carbonate solution. After thirty minutes an aqueous solution of 10.8 parts of 1,3-diaminobenzene is added, stirring is continued for twelve hours at ambient temperature and finally the whole is heated to 50° C. The dye is deposited with 36% hydrochloric acid at a pH of 1, suction filtered and dried at 70° C. A black powder is obtained which is soluble in water to give a violet color and which dyes leather full black hues.

The dyes set out in the following Table are prepared by a method analogous to that in Example 33 from the components specified.

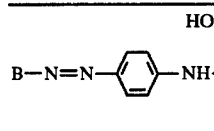

| Example | B | A | Hue |
|---|---|---|---|
| 34 | 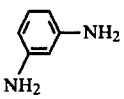 | 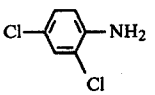 | black, greenish |
| 35 | 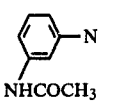 | 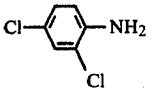 | black |
| 36 | 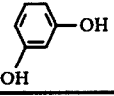 | 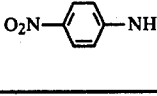 | black, greenish |
| 37 | 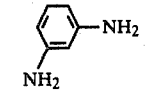 | 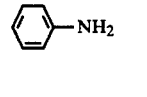 | black |
| 38 | 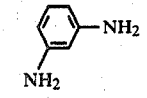 | 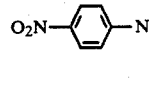 | black, reddish |
| 39 | 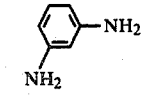 | 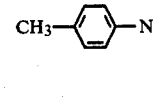 | black, greenish |

EXAMPLE 40

27.9 parts of 4,4′-diaminodiphenylamine-2-sulfonic acid is bisdiazotized as described in Example 24 and then coupled with a neutral solution of 23.9 parts of 1-amino-8-hydroxynaphthalene-4-sulfonic acid. After the unilateral coupling is over the whole is cooled to 10° C., a diazonium salt solution prepared in the usual way from 16.2 parts of 2,4-dichloro-1-aminobenzene is added and the pH is adjusted to 9.5 with dilute caustic soda solution. Thirty minutes later a solution of 12.2 parts of 2,4-diamino-1-methylbenzene in 100 parts of water and 12 parts of 36% hydrochloric acid is added. To complete the coupling the pH is raised to 9.5 with the necessary amount of dilute caustic soda solution and then the whole is stirred for twelve hours at ambient temperature. The pH is adjusted to 1 by adding hydrochloric acid and the dye is salted out with 100 parts of potassium chloride, suction filtered and dried at 70° C. It is obtained a water-soluble black powder which dyes leather black hues.

EXAMPLE 41

27.9 parts of 4,4′-diaminodiphenylamine-2-sulfonic acid is bisdiazotized as described in Example 24 and then coupled with a neutral solution of 31.9 parts of 1-amino-8-hydroxynaphthalene-3,6-disulfonic acid. After the unilateral coupling is completed the whole is cooled to 10° C., a diazonium salt solution prepared by a conventional method from 16.2 parts of 2,4-dichloro-1-aminobenzene is added and the pH is adjusted to 9.5 with dilute caustic soda solution. Thirty minutes later a solution of 12.2 parts of 2,4-diamino-1-methylbenzene in 100 parts of water and 12 parts of 36% hydrochloric acid is added. To complete the coupling the pH is raised to 9.5 with the required amount of dilute caustic soda solution and then the whole is stirred for another twelve hours at ambient temperature. After the pH has been adjusted to 1 by adding hydrochloric acid the dye is salted out with 100 parts of potassium chloride, suction filtered and dried at 70° C. It is obtained as a water-soluble black powder which dyes leather in black hues.

The dyes set out in the following Table are prepared from the components specified by a method analogous to that of Example 41.

Structure:

B—N=N—⟨C6H3(HO3S)⟩—NH—⟨C6H3(HO3S)⟩—N=N—⟨naphthalene(H2N)(OH)(HO3S)(SO3H)⟩—N=N—A

| Example | B | A | Hue |
|---|---|---|---|
| 42 | 2-methyl-1,4-diaminobenzene (CH3, NH2, NH2) | aniline (—NH2) | black, greenish |
| 43 | 2-methyl-1,4-diaminobenzene (CH3, NH3, NH2) | 4-chloroaniline (Cl—⟨⟩—NH2) | black |
| 44 | 2-methyl-1,4-diaminobenzene (CH3, NH2, NH2) | 4-nitroaniline (O2N—⟨⟩—NH2) | black |
| 45 | 2-methyl-1,4-diaminobenzene (CH3, NH2, NH2) | sulfanilic acid (HO3S—⟨⟩—NH2) | black |
| 46 | 2-chloro-1,4-diaminobenzene (Cl, NH2, NH2) | 4-nitroaniline (O2N—⟨⟩—NH2) | black |
| 47 | 2-chloro-1,4-diaminobenzene (Cl, NH2, NH2) | 4-chloroaniline (Cl—⟨⟩—NH2) | black |
| 48 | N,N-diethyl-m-acetylaminoaniline (N(C2H5)2, NHCOCH3) | 4-chloroaniline (Cl—⟨⟩—NH2) | black |
| 49 | N,N-diethylaniline (N(C2H5)2) | 4-nitroaniline (O2N—⟨⟩—NH2) | black |

EXAMPLE 50

30.8 parts of 4-aminobenzenesulfonyl-4'-amino-3'-nitroanilide is dissolved in 200 parts of water and 60 parts of 36% hydrochloric acid, 200 parts of ice is added and bisdiazotization is carried out with a solution of 14.0 parts of sodium nitrite. After about two hours at 0° to 5° C. the excess of nitrite is removed with a little sulfamic acid. A solution of 31.9 parts of 1-amino-8-hydroxynaphthalene-3,6-disulfonic acid in 300 parts of water which has been adjusted to a pH of 6.5 with sodium carbonate is allowed to flow into the tetrazo component. After stirring overnight the coupling is over. The whole is cooled to 10° C. and a diazo solution prepared by a conventional method from 13.8 parts of 4-nitro-1-aminobenzene is added. The pH is adjusted to 7.5 with dilute caustic soda solution to complete the coupling. After sixty minutes an aqueous solution of 10.8 parts of 1,3-diaminobenzene is added and the whole is stirred for another twelve hours. It is then heated to 50° C., a pH of 1 is set up by adding hydrochloric acid, 80 parts of potassium chloride is added, the whole is suction filtered while hot and the dye is dried at 70° C.

A black powder is obtained which dissolved in water to give a violet color and which dyes leather full reddish black shades.

EXAMPLE 51

30.8 parts of 4-amino-3-nitrobenzenesulfonyl-4'-aminoanilide is dissolved in 200 parts of water and 60 parts of 36% hydrochloric acid, 200 parts of ice is added and bisdiazotization is carried out with a solution of 14.0 parts of sodium nitrite. After about two hours at 0° to 5° C. the excess of nitrite is removed with a little sulfamic acid. A solution of 31.9 parts of 1-amino-8-hydroxynaphthalene-3,6-disulfonic acid in 300 parts of water which has been adjusted to pH 6.5 with sodium carbonate is allowed to flow into the tetrazo component. The coupling is completed after stirring overnight. The whole is cooled to 10° C. and a diazo solution prepared by a conventional method from 13.8 parts of 4-nitro-1-aminobenzene is added. To complete coupling the pH is adjusted to 7.5 with dilute caustic soda solution. Sixty minutes later an aqueous solution of 10.8 parts of 1,3-diaminobenzene is added and the whole is stirred for another twelve hours. It is then heated to 50° C., the pH is adjusted to 1 with hydrochloric acid, 80 parts of potassium chloride is added, and the dye is suction filtered while hot and dried at 70° C.

A black powder is obtained which dissolved in water with a violet color and dyes leather full reddish black hues.

The dyes set out in the following Table are prepared by a method analogous to that in Example 50 or 51.

Structure:

$$A-N=N-\text{[1-OH, 8-NH}_2\text{, 3-SO}_3\text{H, 6-SO}_3\text{H naphthalene]}-N=N-Z-N=N-B$$

where the naphthalene bears OH and NH₂ on the peri positions, HO₃S and SO₃H on positions flanking the azo groups.

| Example | A | Z | HB | Hue |
|---|---|---|---|---|
| 52 | 4-O₂N-C₆H₄- | -C₆H₄-SO₂NH-C₆H₃(Cl)- | 1,3-diaminobenzene (NH₂, NH₂) | black |
| 53 | " | -C₆H₄-SO₂NH-C₆H₃(SO₃H)- | " | black |
| 54 | " | -C₆H₄-SO₂NH-C₆H₃(COOH)- | " | black |
| 55 | " | -C₆H₃(NO₂)-SO₂NH-C₆H₃(Cl)- | " | black |
| 56 | " | -C₆H₃(NO₂)-SO₂NH-C₆H₃(NO₂)- | " | black |
| 57 | " | -C₆H₃(NO₂)-SO₂NH-C₆H₃(SO₃H)- | " | black |
| 58 | " | -C₆H₃(NO₂)-SO₂NH-C₆H₃(COOH)- | " | black |
| 59 | " | -C₆H₃(COOH)-SO₂NH-C₆H₄- | " | black |
| 60 | 4-O₂N-C₆H₄- | -C₆H₃(COOH)-SO₂NH-C₆H₃(Cl)- | " | black |
| 61 | " | -C₆H₃(COOH)-SO₂NH-C₆H₃(NO₂)- | " | black |
| 62 | " | -C₆H₃(COOH)-SO₂NH-C₆H₃(SO₃H)- | " | black |

-continued

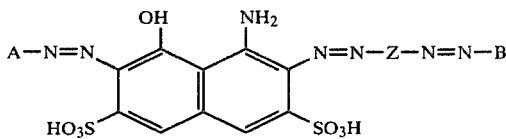

| Example | A | Z | HB | Hue |
|---|---|---|---|---|
| 63 | " | ![structure with COOH, SO2NH, COOH] | " | black |

EXAMPLE 64

A neutral solution of 31.9 parts of 1-amino-8-hydroxynaphthalene-3,6-disulfonic acid in 300 parts of water is allowed to flow into a diazonium salt solution prepared by a conventional method from 13.8 parts of 4-nitro-1-aminobenzene with intense stirring. The coupling is completed after stirring overnight. The whole is cooled to 10° C. and a bisdiazo compound prepared as follows is added: 30.8 parts of 4-aminobenzenesulfonyl-4'-amino-3'-nitroanilide is dissolved in 200 parts of water and 60 parts of 36% hydrochloric acid, 200 parts of ice is added and tetrazotization is carried out with a solution of 14.0 parts of sodium nitrite. After about two hours at 0° to 5° C. the excess of nitrite is removed with a little sulfamic acid. The coupling solution is then adjusted to pH 9.0 with dilute sodium carbonate solution. Thirty minutes later an aqueous solution of 18.5 parts of 3-hydroxydiphenylamine in 100 parts of water and 10 parts of 40% caustic soda solution is added. The whole is stirred for twelve hours at ambient temperature and the dye is salted out with 100 parts of potassium chloride, suction filtered and dried at 70° C. It is obtained as a black powder which dissolves in water to give a dark green color and dyes leather full black hues.

EXAMPLE 65

A neutral solution of 31.9 parts of 1-amino-8-hydroxynaphthalene-3,6-disulfonic acid in 300 parts of water is allowed to flow with intense stirring into a diazonium salt solution prepared by a conventional method from 13.8 parts of 4-nitro-1-aminobenzene. The coupling is over after stirring overnight. The whole is cooled to 0° C. and there is added a bisdiazo compound prepared as follows: 30.8 parts of 4-amino-3-nitrobenzenesulfonyl-4'-aminoanilide is dissolved in 200 parts of water and 60 parts of 36% hydrochloric acid, 200 parts of ice is added and tetrazotization is carried out with a solution of 14.0 parts of sodium nitrite. After about two hours at 0° to 5° C. the excess of nitrite is removed with a little sulfamic acid. The coupling solution is then adjusted to pH 9.0 with dilute sodium carbonate solution. Thirty minutes later an aqueous solution of 18.5 parts of 3-hydroxydiphenylamine in 100 parts of water and 10 parts of 40% caustic soda solution is added. The whole is stirred for another twelve hours at ambient temperature and the dye is salted out with 100 parts of potassium chloride, suction filtered and dried at 70° C. It is obtained as a black powder which dissolves in water with a dark green color and which dyes leather full black hues.

The dyes set out in the following Table are prepared from the components specified by a method analogous to Example 64 or 65.

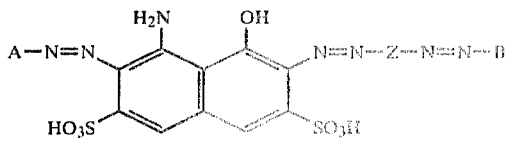

| Example | A | Z | B | Hue |
|---|---|---|---|---|
| 66 | O2N—⟨⟩— | —⟨⟩—SO2NH—⟨⟩—Cl | ⟨⟩—NH—⟨⟩—OH | black |
| 67 | " | —⟨⟩—SO2NH—⟨⟩—SO3H | " | black |
| 68 | " | —⟨⟩—SO2NH—⟨⟩—COOH | " | black |

-continued

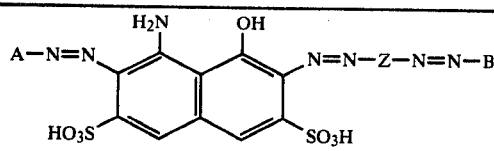

| Example | A | Z | B | Hue |
|---------|---|---|---|-----|
| 69 | " | 4-methyl-3-nitrophenyl-SO₂NH-(4-methyl-3-chlorophenyl) | " | black |
| 70 | " | 4-methyl-3-nitrophenyl-SO₂NH-(4-methyl-3-nitrophenyl) | " | black |
| 71 | " | 4-methyl-3-nitrophenyl-SO₂NH-(4-methyl-3-sulfophenyl) | " | black |
| 72 | " | 4-methyl-3-nitrophenyl-SO₂NH-(4-methyl-3-carboxyphenyl) | " | black |
| 73 | " | 4-methyl-3-carboxyphenyl-SO₂NH-(4-methylphenyl) | -(4-phenyl)-NH-(3-hydroxyphenyl) OH | black |
| 74 | " | 4-methyl-3-carboxyphenyl-SO₂NH-(4-methyl-3-chlorophenyl) | " | black |
| 75 | " | 4-methyl-3-carboxyphenyl-SO₂NH-(4-methyl-3-nitrophenyl) | " | black |
| 76 | " | 4-methyl-3-carboxyphenyl-SO₂NH-(4-methyl-3-sulfophenyl) | " | black |
| 77 | " | 4-methyl-3-carboxyphenyl-SO₂NH-(4-methyl-3-carboxyphenyl) | " | black |

EXAMPLE 78

A neutral solution of 31.9 parts of 1-amino-8-hydroxynaphthalene-3,6-disulfonic acid in 300 parts of water is allowed to flow with intense stirring into a diazonium salt solution prepared in the usual way from 13.8 parts of 4-nitro-1-aminobenzene. The coupling is over after stirring overnight. The whole is cooled to 10° C. and there is added a bisdiazo compound in the form of a suspension which has been prepared as follows: 26.3 parts of 4-aminobenzenesulfonyl-4'-aminoanilide is dissolved in 200 parts of water and 60 parts of 36% hydrochloric acid, 200 parts of ice is added and tetrazotization is carried out with a solution of 14.0 parts of sodium nitrite. After about two hours at 0° to 5° C. the excess of nitrite is removed with a little suflamic acid. Then the coupling solution is adjusted to pH 9.0 with dilute sodium carbonate solution. After thirty minutes an aqueous solution of 18.5 parts of 3-hydroxydiphenylamine in 100 parts of water and 10 parts of 40% caustic soda solution is added. The whole is stirred for another twelve hours at ambient temperature and the dye is salted out with 100 parts of potassium chloride, suction filtered and dried at 70° C. It is a black powder which dissolves in water with a dark green color and dyes leather full black hues.

The dyes set out in the following Table from the components specified are prepared by a method analogous to that in Example 78:

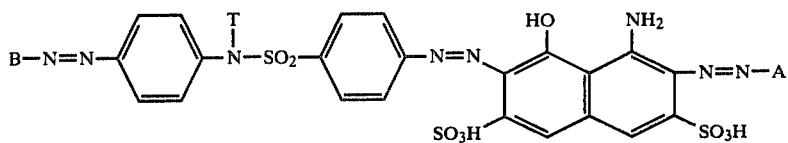

| Example | B | T | A | Hue |
|---|---|---|---|---|
| 79 | OH, C6H4-NH-C6H5 | CH3 | O2N—C6H4—NH2 | black |
| 80 | " | " | HO3S—C6H4—NH2 | black, reddish |
| 81 | " | " | Cl—C6H4—NH2 | black, reddish |
| 82 | " | " | Cl,Cl—C6H3—NH2 | black, reddish |
| 83 | " | " | C6H5—N=N—C6H4—NH2 | black, reddish |
| 84 | " | C2H4CN | O2N—C6H4—NH2 | black, reddish |
| 85 | NH2, NH2—C6H4 | CH3 | " | black |
| 86 | " | " | Cl—C6H4—NH2 | " |
| 87 | " | " | HO3S—C6H4—NH2 | " |
| 88 | " | " | C6H5—N=N—C6H4—NH2 | " |
| 89 | " | C2H5 | O2N—C6H4—NH2 | " |
| 90 | " | C2H4OH | Cl—C6H4—NH2 | " |
| 91 | " | C2H4CN | C6H5—N=N—C6H4—NH2 | " |
| 92 | OH, OH—C6H4 | CH3 | Cl—C6H4—NH2 | green |
| 93 | " | CH2CHOHCH3 | " | " |

-continued

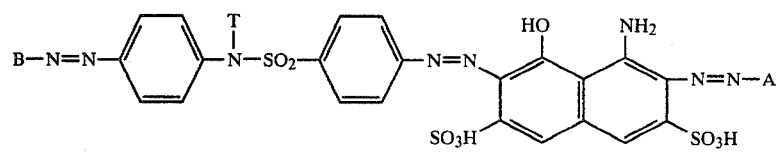

| Example | B | T | A | Hue |
|---|---|---|---|---|
| 94 | " | CH$_3$ | O$_2$N—⌬—NH$_2$ | " |
| 95 | " | C$_2$H$_4$COOCH$_3$ | Cl—⌬—NH$_2$ | " |
| 96 | " | CH$_2$C$_6$H$_5$ | " | " |
| 97 | " | C$_2$H$_4$COOH | HO$_3$S—⌬—NH$_2$ | " |
| 98 | " | CH$_3$ | " | " |
| 99 | " | C$_2$H$_4$COOC$_4$H$_9$ | Cl—⌬—NH$_2$ | " |
| 100 | " | C$_2$H$_4$OH | " | " |
| 101 | " | C$_2$H$_4$CN | " | " |
| 102 | OH—⌬—N(H)—⌬ | | HO$_3$S—⌬—NH$_2$ | black |
| 103 | ⌬(OH)(CH$_3$) | | O$_2$N—⌬—NH$_2$ | black, greenish |
| 104 | ⌬(OH)(N(C$_2$H$_5$)$_2$) | C$_2$H$_5$ | " | black |
| 105 | ⌬(N)(SO$_3$H) | " | Cl—⌬—NH$_2$ | black, bluish |
| 106 | ⌬(SO$_3$H)(NH$_2$)(NH$_2$) | | " | black, bluish |

EXAMPLE 107

A neutral solution of 31.9 parts of 1-amino-8-hydroxynaphthalene-4,6-disulfonic acid in 300 parts of water is allowed to flow with intense stirring into a diazonium salt solution prepared in the usual way from 13.8 parts of 4-nitro-1-aminobenzene. The coupling is over after stirring overnight. The whole is cooled to 10° C. and there is added as a suspension a bisdiazo compound prepared as follows: 26.3 parts of 4-aminobenzenesulfonyl-4'-aminoanilide is dissolved in 200 parts of water and 60 parts of 36% hydrochloric acid, 200 parts of ice is added and then tetrazotization is effected with a solution of 14.0 parts of sodium nitrite. After about two hours at 0° to 5° C. the excess of nitrite is removed with a little sulfamic acid. Then the coupling solution is adjusted to a pH of 9.0 with dilute sodium carbonate solution. Thirty minutes later an aqueous solution of 18.5 parts of 3-hydroxydiphenylamine in 100 parts of water and 10 parts of 40% caustic soda solution is added. The whole is stirred for another twelve hours at ambient temperature and the dye is salted out with 100 parts of potassium chloride, suction filtered and dried at 70° C. It is a black powder which dissolves in water with a dark green color and dyes leather full black hues.

EXAMPLE 108

A neutral solution of 31.9 parts of 1-amino-8-hydroxynaphthalene-3,6-disulfonic acid in 300 parts of water is allowed to flow as in Example 107 into a diazonium salt solution prepared by a conventional method from 12.7 parts of 4-chloro-1-aminobenzene. Neutralization to a pH of 2.5 is effected within three hours at 5° to 10° C. with a dilute sodium acetate solution and the whole is stirred for another twelve hours. Coupling is complete during this period. The whole is cooled to 10° C. and a tetrazo component obtained from 26.3 parts of 4-aminobenzenesulfonyl-4'-aminoanilide is added. The coupling solution is adjusted to a pH of 9.0 with dilute sodium carbonate solution. Thirty minutes later an aqueous solution of 10.8 parts of 1,3-diaminobenzene is added and the whole is stirred for another twelve hours at ambient temperature. The dye is salted out with 100 parts of potassium chloride, suction filtered and dried at 70° C. It dyes leather full black hues.

The dyes set out in the following Table are prepared by a method analogous to that in Example 108.

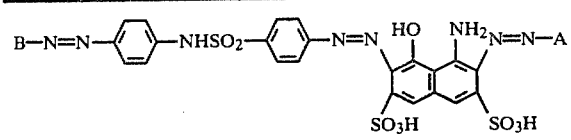

| Example | B | A | Hue |
|---|---|---|---|
| 109 | ⌬—NH₂ (with NH₂) | O₂N—⌬—NH₂ | black |
| 110 | ⌬—NH₂ (with NH₂) | HO₃S—⌬—NH₂ | black |
| 111 | ⌬—NH₂ (with NH₂) | O₂N—⌬—NH₂ (with SO₃H) | black |
| 112 | ⌬—OH (with OH) | O₂N—⌬—NH₂ | black, greenish |
| 113 | ⌬—OH (with OH) | Cl—⌬—NH₂ | black, greenish |

EXAMPLE 114

A neutral solution of 23.9 parts of 1-amino-8-hydroxynaphthalene-4-sulfonic acid in 300 parts of water is allowed to flow as in Example 17 into a diazonium salt solution prepared by a conventional method from 12.7 parts of 4-chloro-1-aminobenzene. The whole is then neutralized to pH 2.5 with a dilute sodium acetate solution at 5° to 10° C. within three hours and is then stirred for another twelve hours. The coupling is over within this period. The whole is cooled to 10° C. and a tetrazo component prepared from 26.3 parts of 4-aminobenzenesulfonyl-4'-aminoanilide is introduced. Then the coupling solution is adjusted to a pH of 9.0 with dilute sodium carbonate solution. After thirty minutes an aqueous solution of 10.8 parts of 1,3-diaminobenzene is added and stirring is continued for twelve hours at room temperature. The dye is salted out with 100 parts of potassium chloride, suction filtered and dried at 70° C. It dyes leather full reddish black hues.

EXAMPLE 115

A neutral solution of 31.9 parts of 1-amino-8-hydroxynaphthalene-3,6-disulfonic acid is allowed to flow slowly with intense stirring into a diazonium salt solution prepared from 16.8 parts of 2,4-dichloro-1-aminobenzene. Coupling is completed after stirring overnight. The whole is cooled to 10° C. and a tetrazo compound prepared from 26.3 parts of 4-aminobenzenesulfonyl-4'-aminoanilide as described in Example 78 is added. The coupling solution is then brought to pH 9.0 with dilute sodium carbonate solution. Thirty minutes later a solution of 12.2 parts of 2,4-diamino-1-methylbenzene, 100 parts of water and 12 parts of 36% hydrochloric acid is added; to complete coupling the pH is raised to 9.5 with the necessary amount of sodium carbonate solution and the mixture is stirred at room temperature for another twelve hours. It is then heated to 70° C., 100 parts of potassium chloride is added, and the dye is suction filtered at the salting out temperature and dried at 70° C. It dyes leather full black hues.

The dyes set out in the following Table are prepared analogously to Example 115.

B—N=N—⌬—NHSO₂—⌬—N=N—[naphthalene with HO, NH₂, SO₃H, SO₃H]—N=N—A

| Example | B | A | Hue |
|---|---|---|---|
| 116 | CH₃-⌬-NH₂ (with NH₂) | Cl—⌬—NH₂ | black |
| 117 | CH₃-⌬-NH₂ (with NH₂) | O₂N—⌬—NH₂ | black |
| 118 | CH₃-⌬-NH₂ (with NH₂) | HO₃S—⌬—NH₂ | black |
| 119 | CH₃-⌬-NH₂ (with NH₂) | O₂N—⌬—NH₂ (with SO₃H) | black |
| 120 | CH₃-⌬-N(C₂H₄OH)₂ | HO₃S—⌬—NH₂ | black |

-continued

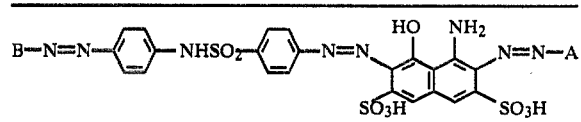

| Example | B | A | Hue |
|---|---|---|---|
| 121 | 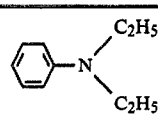 | 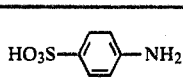 | black |

-continued

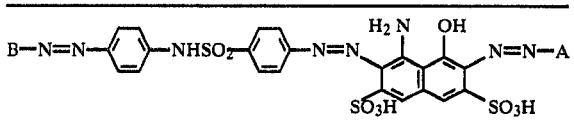

| Example | B | A | Hue |
|---|---|---|---|
| 126 | 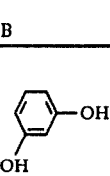 | 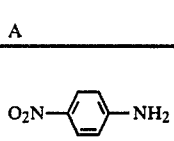 | dark green |

EXAMPLE 127

26.3 parts of 4-aminobenzenesulfonyl-4'-aminoanilide is dissolved in 200 parts of water and 60 parts of 36% hydrochloric acid, 200 parts of ice is added and bisdiazotization is carried out with a solution of 14.0 parts of sodium nitrite. After about two hours at 0° to 5° C. the excess of nitrite is removed with a little sulfamic acid; a solution of 31.9 parts of 1-amino-8-hydroxynaphthalene-4,6-disulfonic acid in 300 parts of water which has been brought to pH 6.5 with sodium carbonate is allowed to flow into the tetrazo component. The coupling is completed by stirring overnight. The whole is cooled to 10° C. and a diazo solution prepared by a conventional method from 13.8 parts of 4-nitro-1-aminobenzene is added. The whole is then brought to pH 7.5 with dilute caustic soda solution to complete the coupling. Sixty minutes later an aqueous solution of 10.8 parts of 1,3-diaminobenzene is added and the whole is stirred for another twelve hours. It is then heated to 50° C., adjusted to pH 1 by adding hydrochloric acid, 80 parts of potassium chloride is added, and the dye is suction filtered while hot and dried at 70° C.

A black powder is obtained which dissolves in water with a violet color and dyes leather full reddish black hues.

EXAMPLE 128

26.3 parts of 4-aminobenzenesulfonyl-4'-aminoanilide is bisdiazotized as described in Example 127. A neutral solution of 31.9 parts of 1-amino-8-hydroxynaphthalene-3,6-disulfonic acid in 300 parts of water is then allowed to flow in. Coupling is complete after stirring overnight. The whole is cooled to 10° C. and a diazo solution prepared by a conventional method from 16.8 parts of 2,4-dichloro-1-aminobenzene is added. A pH of 7.5 is then set up with dilute sodium carbonate solution. Sixty minutes later a solution of 12.2 parts of 2,4-diaminotoluene, 100 parts of water and 12 parts of 36% hydrochloric acid is added. To complete coupling the pH is raised to 9.5 with the necessary amount of anhydrous sodium carbonate and the whole is stirred at room temperature for another twelve hours. The whole is then heated to 70° to 80° C., 100 parts of potassium chloride is added, and the dye is suction filtered at the salting-out temperature and dried at 70° C. A black powder is obtained which dyes leather reddish black hues.

The dyes specified in the following tabulated Examples are prepared analogously to Example 128.

EXAMPLE 122

26.3 parts of 4-aminobenzenesulfonyl-4'-aminoanilide is dissolved in 200 parts of water and 60 parts of 36% hydrochloric acid, 200 parts of ice is added and bisdiazotization is carried out with a solution of 14.0 parts of sodium nitrite. After about two hours at 0° to 5° C. the excess of nitrite is removed with a little sulfamic acid. Then a solution of 31.9 parts of 1-amino-8-hydroxynaphthalene-3,6-disulfonic acid in 300 parts of water which has been adjusted to pH 6.5 with sodium carbonate is allowed to flow into the tetrazo component. Coupling is complete after stirring overnight. The whole is cooled to 10° C. and a diazo solution prepared in the usual way from 13.8 parts of 4-nitro-1-aminobenzene is added. A pH of 7.5 is set up with dilute caustic soda solution to complete the coupling. Sixty minutes later an aqueous solution of 10.8 parts of 1,3-diaminobenzene is added and the whole is stirred for another twelve hours. It is then heated to 50° C., a pH of 1 is set up by adding hydrochloric acid, 80 parts of potassium chloride is added, and the dye is suction filtered while hot and dried at 70° C.

A black powder is obtained which dissolves in water with a violet color and dyes leather full reddish black hues.

The dyes set out in the following Table are prepared analogously to Example 122.

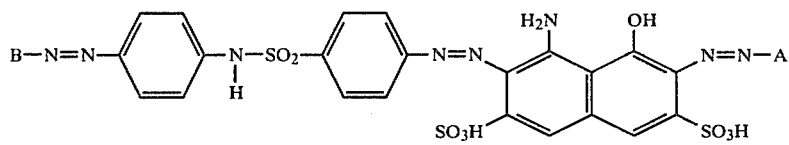

| Example | B | A | Hue |
|---|---|---|---|
| 129 | 2,4-diamino-toluene (CH3, NH2, NH2) | HO3S—C6H4—NH2 | black |
| 130 | 2,4-diamino-toluene | C6H5—NH2 | black, greenish |
| 131 | 2,4-diamino-toluene | Cl—C6H4—NH2 | black |
| 132 | 2,4-diamino-toluene | O2N—C6H4—NH2 | black |
| 133 | 3-methyl-N,N-bis(2-hydroxyethyl)aniline | C6H5—NH2 | black, greenish |
| 134 | 3-(N,N-diethylamino)acetanilide | Cl—C6H4—NH2 | black |
| 135 | N,N-diethylaniline | O2N—C6H4—NH2 | black |
| 136 | 2,4-diamino-toluene | HO3S—C6H4—N=N—C6H4—NH2 | black |
| 137 | 2,4-diamino-toluene | HO3S—C6H4—N=N—C6H3(SO3H)—NH2 | black |

EXAMPLE 138

26.3 parts of 4-aminobenzenesulfonyl-4′-aminoanilide is bisdiazotized as described in Example 127. A neutral solution of 23.9 parts of 1-amino-8-hydroxynaphthalene-4-sulfonic acid in 300 parts of water is allowed to flow into the tetrazo component. Coupling is over after stirring overnight. The whole is cooled to 10° C. and a diazo solution from 16.8 parts of 2,4-dichloro-1-aminobenzene prepared in the usual way is added. A pH of 7.5 is then set up with dilute sodium carbonate solution. Sixty minutes later a solution of 12.2 parts of 2,4-diaminotoluene, 100 parts of water and 12 parts of 36% hydrochloric acid is added. To complete coupling the pH is raised to 9.5 with the necessary amount of sodium carbonate (anhydrous) and the whole is stirred for another twelve hours at room temperature. The whole is then heated to 70° to 80° C., 100 parts of potassium chloride is introduced, and the dye is suction filtered at the salting-out temperature and dried at 70° C. A black powder is obtained which dyes leather reddish black hues.

EXAMPLE 139

26.3 parts of 4-aminobenzenesulfonyl-4'-aminoanilide is dissolved in 200 parts of water and 60 parts of 36% hydrochloric acid, 200 parts of ice is added and tetrazotization is carried out with a solution of 14.0 parts of sodium nitrite. After about two hours at 0° to 5° C. the excess of nitrite is removed with a little sulfamic acid; a neutral solution of 31.9 parts of 1-amino-8-hydroxynaphthalene-3,6-disulfonic acid in 300 parts of water is then allowed to flow into the tetrazo component. Coupling is complete after stirring overnight. The whole is cooled to 10° C. and a diazo solution prepared by a conventional method from 12.7 parts of 4-chloro-1-aminobenze is added. The pH of the coupling solution is raised to 7.5 with dilute caustic soda solution. After sixty minutes an aqueous solution of 18.5 parts of 3-hydroxydiphenylamine, 100 parts of water and 10 parts of 40% caustic soda solution is added, stirring is continued for another twelve hours and then the whole is heated to 50° C.

The dye is salted out with 100 parts of potassium chloride, suction filtered and dried at 70° C. It dyes leather full black hues.

The dyes set out in the following Table are prepared by a method which is analogous to that in Example 139.

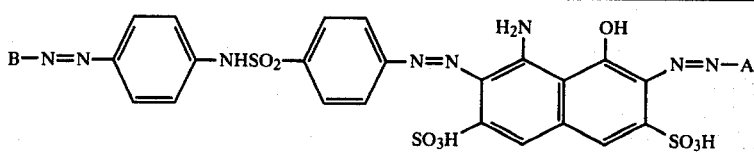

| Example | B | A | Hue |
|---|---|---|---|
| 140 | OH-C6H4-N(H)-C6H5 | C6H5-NH2 | black, greenish |
| 141 | OH-C6H4-N(H)-C6H5 | O2N-C6H4-NH2 | black |
| 142 | OH-C6H4-N(H)-C6H5 | (o-CH3)C6H4-NH2 | black, greenish |
| 143 | OH-C6H4-N(H)-C6H5 | (m-CH3)C6H4-NH2 | black, greenish |
| 144 | OH-C6H4-N(H)-C6H5 | HO3S-C6H4-NH2 | black, greenish |
| 145 | OH-C6H4-N(H)-C6H5 | Br-C6H4-NH2 | black |
| 146 | OH-C6H4-N(H)-C6H5 | HO3S-C6H4-N=N-C6H4-NH2 | black |
| 147 | CH3-C6H4-N(H)-C6H5 | HO3S-C6H4-N=N-C6H3(CH3)-NH2 | black |
| 148 | C6H5-OH | O2N-C6H4-NH2 | dark green |

-continued
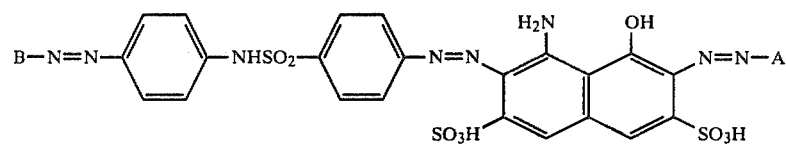
| Example | B | A | Hue |
|---|---|---|---|
| 149 | 3-methylphenol (OH, CH₃) | O₂N—C₆H₄—NH₂ | black, greenish |
| 150 | 3-(N,N-diethylamino)phenol (OH, N(C₂H₅)₂) | O₂N—C₆H₄—NH₂ | black, greenish |
| 151 | 3-(N,N-diethylamino)benzenesulfonic acid (SO₃H, N(C₂H₅)₂) | Cl—C₆H₄—NH₂ | black, bluish |
| 152 | 6-sulfo-3-hydroxy-2-naphthalenesulfonic acid (SO₃H, OH, SO₃H) | Cl—C₆H₄—NH₂ | black |
We claim:
1. The dye of the formula
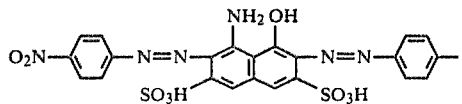
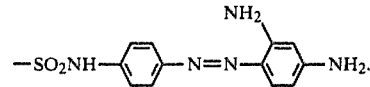
* * * * *

UNITED STATES PATENT AND TRADEMARK OFFICE
CERTIFICATE OF CORRECTION

PATENT NO. : 4,479,906
DATED : October 30, 1984
INVENTOR(S) : Georg ZEIDLER et al.

It is certified that error appears in the above-identified patent and that said Letters Patent is hereby corrected as shown below:

Add: FOREIGN APPLICATION PRIORITY DATA

Nov. 9, 1972 Fed Republic of Germany.... 2254835

This was omitted in the patent - first page

Signed and Sealed this

Fifteenth Day of October 1985

[SEAL]

Attest:

DONALD J. QUIGG

Attesting Officer

Commissioner of Patents and
Trademarks—Designate